(12) United States Patent
Humble (10) Patent No.: US 9,982,417 B1
(45) Date of Patent: May 29, 2018

(54) WATER DELIVERY APPARATUS

(71) Applicant: Erik L. Humble, Otis Orchards, WA (US)

(72) Inventor: Erik L. Humble, Otis Orchards, WA (US)

( * ) Notice: Subject to any disclaimer, the term of this patent is extended or adjusted under 35 U.S.C. 154(b) by 438 days.

(21) Appl. No.: 14/756,582

(22) Filed: Sep. 18, 2015

(51) Int. Cl.
| | |
|---|---|
| *E03B 7/07* | (2006.01) |
| *F04B 53/10* | (2006.01) |
| *E03B 1/04* | (2006.01) |
| *E03B 7/08* | (2006.01) |
| *F17D 1/14* | (2006.01) |

(52) U.S. Cl.
CPC ............. *E03B 7/074* (2013.01); *E03B 1/042* (2013.01); *E03B 7/077* (2013.01); *E03B 7/08* (2013.01); *F04B 53/10* (2013.01); *F17D 1/14* (2013.01); *C02F 2201/008* (2013.01); *Y10T 137/86027* (2015.04); *Y10T 137/86043* (2015.04); *Y10T 137/87265* (2015.04); *Y10T 137/87877* (2015.04); *Y10T 137/87925* (2015.04)

(58) Field of Classification Search
CPC ..... Y10T 137/86043; Y10T 137/86027; Y10T 137/87877; Y10T 137/87925; Y10T 137/87265; E03B 1/042; E03B 7/074; E03B 7/077; E03B 7/08; C02F 2201/008; F04B 53/10
See application file for complete search history.

(56) References Cited

U.S. PATENT DOCUMENTS

| | | | | |
|---|---|---|---|---|
| 5,351,337 | A * | 9/1994 | Deutsch | E03B 11/00 122/13.3 |
| 6,471,476 | B1 * | 10/2002 | Diels | F04D 29/426 416/1 |
| 6,915,924 | B1 * | 7/2005 | Noiseux | E03B 7/07 222/64 |
| 7,207,748 | B1 * | 4/2007 | Urban | A01G 25/00 405/51 |
| 2006/0070661 | A1 * | 4/2006 | Wheeler | A01G 25/145 137/355.12 |
| 2012/0261359 | A1 * | 10/2012 | Quintel | B01D 24/042 210/806 |
| 2013/0121853 | A1 * | 5/2013 | Kleinpeter | F04B 43/06 417/279 |
| 2016/0016825 | A1 * | 1/2016 | Roberts | C02F 1/441 210/85 |

* cited by examiner

*Primary Examiner* — Atif Chaudry
(74) *Attorney, Agent, or Firm* — Steven M. Bertone (57) ABSTRACT

In one representative example, a water delivery apparatus includes a chassis and a water system supported on the chassis. The water system is substantially lead-free and adapted for use with potable water. The system includes a manifold adapted to convey and/or contain water in a substantially leak-proof manner. The manifold extends between an intake connection and a distal terminus valve. The system also includes first, second and third outlet legs and a pump adapted to induce water flow within the manifold principally from the intake connection to one or more of the outlet legs. The system also includes a pressure switch, an accumulator tank and a cycle to stop valve, all of which are operatively connected to the manifold.

9 Claims, 6 Drawing Sheets

WATER DELIVERY APPARATUS

BACKGROUND

Various types of field operations, such as military field operations for example, often require that personnel remain in the field for extended periods of time. Such field operations can be located in remote areas of relatively harsh environmental conditions. It is desirable to provide various amenities for use by personnel during such field operations. These amenities can include, for example, kitchen facilities, bathing (or showering) facilities, laundry facilities and restroom facilities. Such facilities often require a reliable supply of clean water for operation. For example, kitchen facilities can require potable water for preparation of food and beverages. Bathing facilities, as well as laundry facilities, can require clean water for bathing and for laundering, respectively. Restroom facilities can require clean water for hand washing and for flushing of waste material. It is desirable to provide a reliable apparatus for delivering clean water for use in the aforementioned field operations.

DETAILED DESCRIPTION

Figure 1:
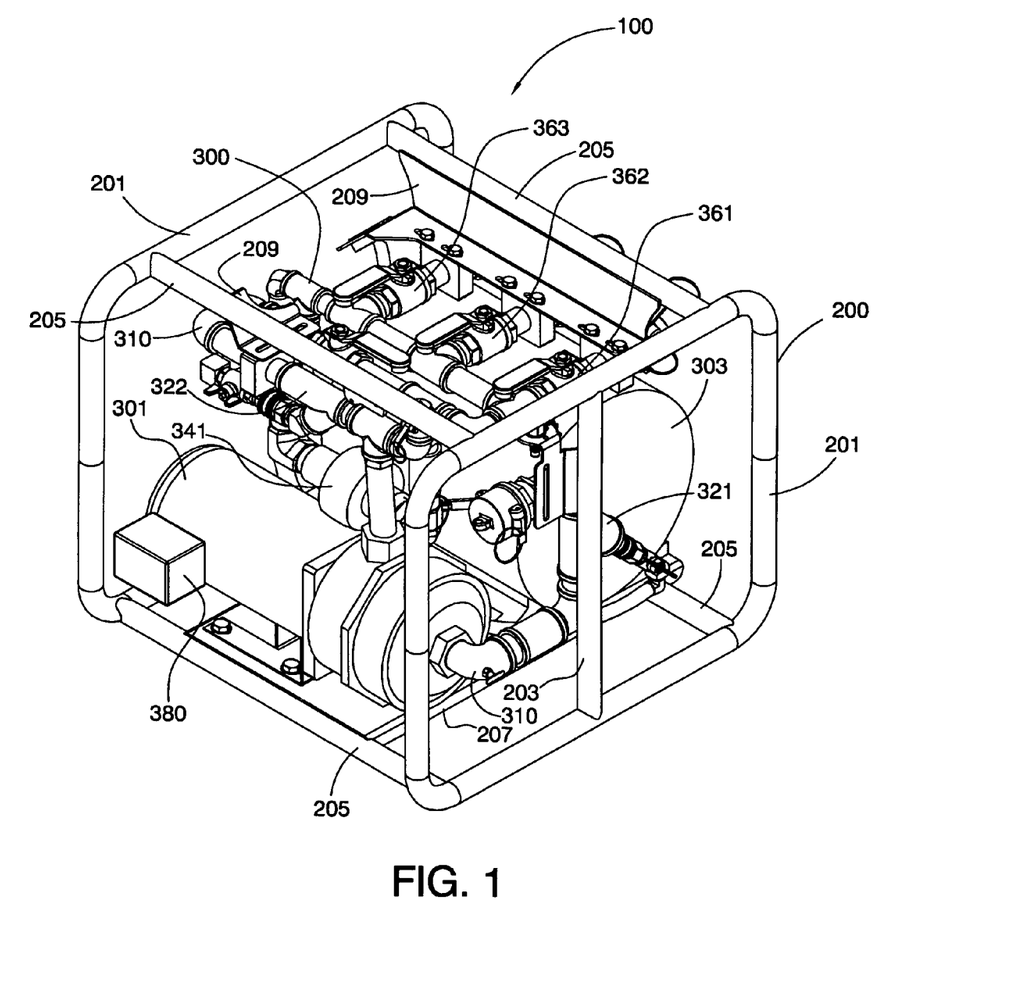
FIG. 1 is an isometric view of an apparatus according to an exemplary embodiment of the disclosure.
Figure 2:
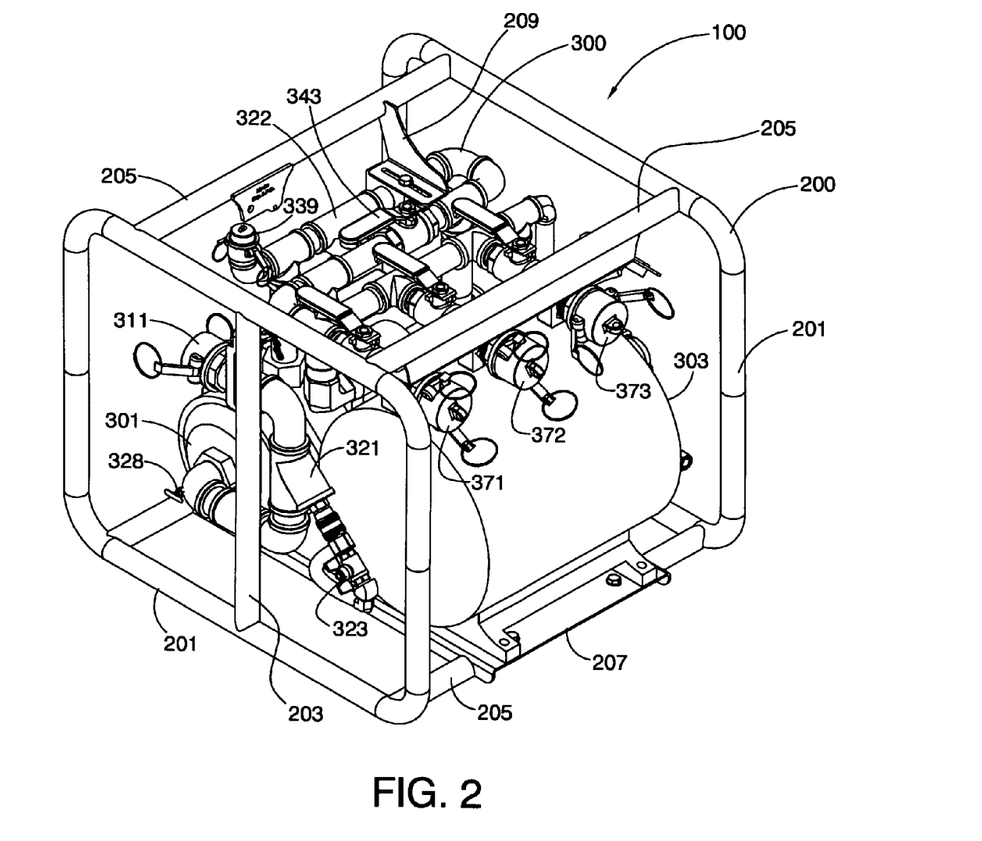
FIG. 2 is another isometric view of the apparatus depicted in FIG. 1.
Figure 3:
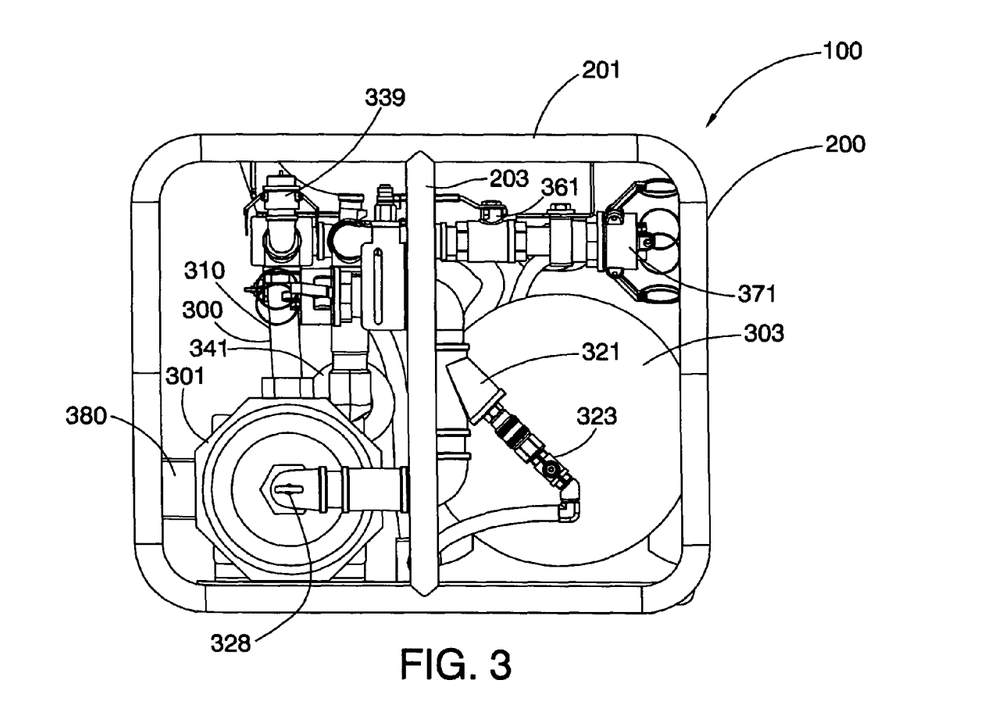
FIG. 3 is a first side elevation view of the apparatus depicted in FIG. 1.
Figure 4:
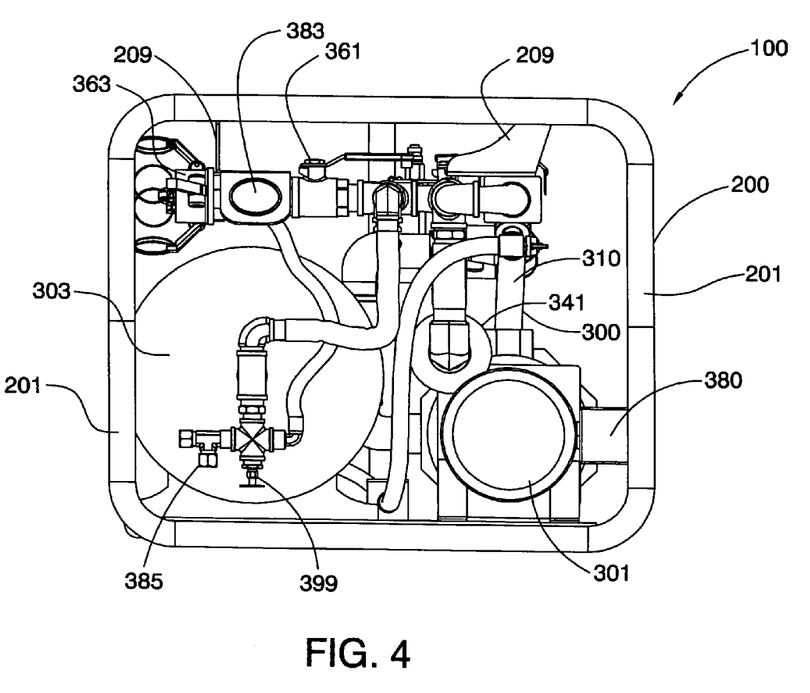
FIG. 4 is a second side elevation view of the apparatus depicted in FIG. 1.
Figure 5:
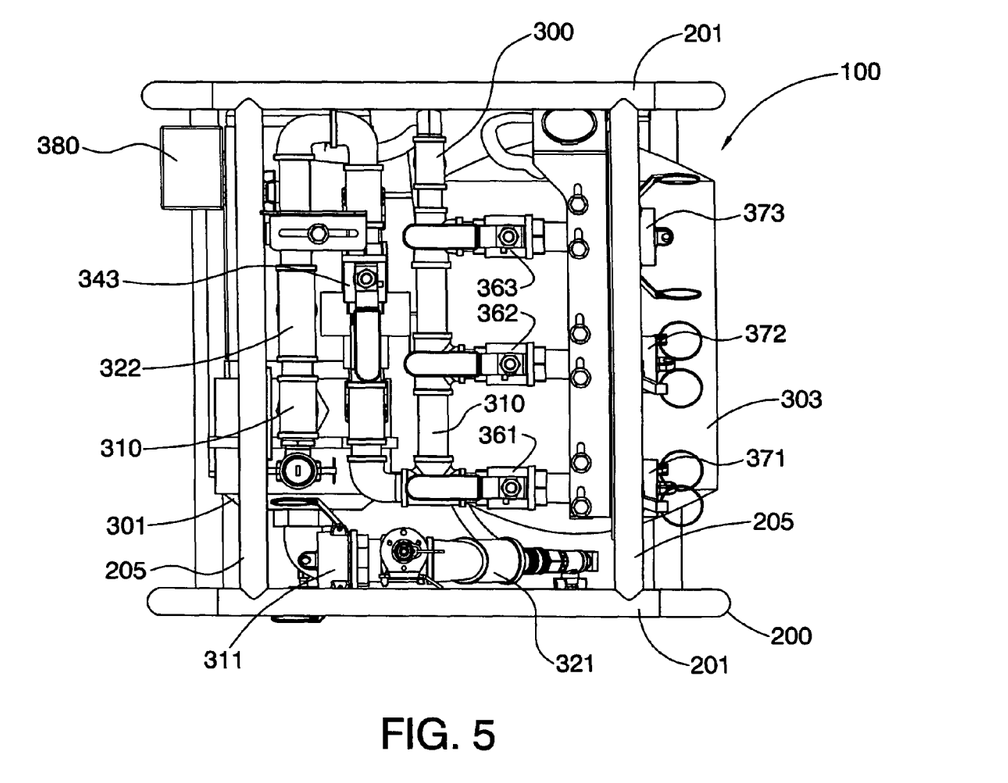
FIG. 5 is a top view of the apparatus depicted in FIG. 1.

With reference to the drawings, FIG. 1 and FIG. 2 are each isometric views of an exemplary apparatus 100 according to one embodiment of the disclosure, while FIG. 3 is a side elevation view of a first side thereof, and FIG. 4 is a side elevation view of a second side thereof, wherein the second side is opposite of the first side. FIG. 5 is a top view of the exemplary apparatus 100. With continued reference to FIGS. 1 through 5, the apparatus 100 includes a chassis 200 and a water system 300 supported on the chassis. The water system 300 is substantially lead-free so as to be adapted for use in delivery and/or handling of potable water, including drinking water intended for human consumption. That is, the water system 300 is preferably constructed from materials and/or components that meet standards and/or rules applicable to systems intended to handle, contain and/or deliver drinking water. By way of example only, such standards and/or rules include, but are not necessarily limited to United States federal law known as the Safe Drinking Water Act, or also is known as the "SDWA."

The chassis 200 is adapted to serve as a structural frame to support the water system 300. The chassis 200 is preferably adapted to serve as a suitable means for manually grasping the apparatus 100 for the purposes of handling thereof. More specifically, one or more portions of the chassis 200 are adapted to serve as handles for lifting, moving and/or positioning the apparatus 100. Moreover, one or more portions of the chassis 200 are preferably adapted to accommodate means of securing and/or tying down the apparatus 100 while in operation and/or while in transit. By way of example, the chassis 200 is preferably adapted to accommodate the use of tie-down hooks or straps and/or other such tie-down means (not shown) for the purposes of securing the apparatus 100 to a pallet (not shown) for example. Furthermore; as is seen from a study of FIGS. 1 through 5, the chassis 200 is preferably adapted to contain within its perimeter, the water system 300 so as to provide a measure of protection thereto.

The chassis 200 includes a pair of frame members 201. The frame members 201 can be substantially similar to each other. Each of the frame members 201 is substantially in the form of a continuous loop of elongated structural material, such as by way of example only, metal structural tubing of substantially circular cross-section. One or more frame members 201 can be made of a plurality of sections of elongated structural material that are joined such as by welding or the like. As is evident from a study of FIGS. 1 through 5, each frame member 201 is substantially planar and has a substantially rectangular shape with substantially rounded corners. As is also seen, the frame members 201 are oriented in substantially parallel, offset juxtaposition relative to one another. At least one of the frame members 201 can include at least one intermediate member 203. As is seen from an examination of FIGS. 1 and 2, the exemplary chassis 200 can have a generally cubical shape. Moreover, it is further evident that the exemplary chassis 200 can be described as skeletal in general form.

The chassis 200 includes a plurality of elongated cross members 205. Each of the cross members 205 is substantially straight and can be formed from substantially the same structural material from which the frame members 201 are formed. Each cross member 205 is affixed to, and extends between, each of the frame members 201. Preferably, each of the cross members 205 has a substantially perpendicular orientation relative to each of the frame members 201. At least one of the cross members 205 supports at least a portion of the water system 300. Preferably, the water system 300 is supported by a plurality of cross members 205.

With continued examination of FIGS. 1 through 5, the exemplary chassis 200 includes a mounting plate 207. The mounting plate 207 is supported by at least two of the cross members 205. More specifically, the mounting plate 207 is preferably affixed to two of the cross members 205 as shown. The mounting plate 207 is substantially planar and is preferably substantially flat. The exemplary mounting plate 207 is formed from metal plate and/or metal sheet. The mounting plate 207 can include various reinforcement means formed in, or added thereto, such as ribs, gussets and the like (not shown).

The chassis 200 can include at least one mounting flange 209. More specifically, the exemplary chassis 200 includes a plurality of mounting flanges 209. Each mounting flange 209 is preferably supported by a respective cross member 205. The exemplary mounting flanges 209 are affixed to respective cross members 205. Moreover, the mounting flanges 209 can be positioned relative to the chassis 200 so as to be substantially distal from the mounting plate 207. As can be seen from examination of FIGS. 1 through 5, the exemplary mounting flanges 209 are not supported by any cross members 205 by which the mounting plate 207 is supported. That is, the mounting plate 207 and the mounting flanges 209 are preferably not supported by a common cross member 205. Each of the exemplary mounting flanges 209 is formed from metal plate and/or metal sheet. Each mounting flange 209 can include various reinforcement means such as ribs, gussets and the like (not shown).

With further reference to FIGS. 1 through 5, the water system 300 includes a pump 301. The pump 301 is supported by the chassis 200. Preferably, the pump 301 is supported by the mounting plate 207. The exemplary pump 301 is in the form of an electrically powered centrifugal pump. The exemplary apparatus 100 includes a power connection means 380, which is shown in FIGS. 1 and 3 through 5. The power connection means 380 is adapted to facilitate connection of operational power to the apparatus 100. Such operational power can be in the form of electrical power. By way of example, the power connection means 380 can include a conventional electrical connection, such as a socket or the like (not shown), that is adapted to electrically connect an electrical power cord (not shown) to the apparatus 100. The power connection means 380 is adapted to facilitate distribution of power to the pump 301 as well as other components of the apparatus 100 by way of conventional power distribution means.

With continued reference to FIGS. 1 through 5, the water system 300 also includes a hydraulic accumulator 303 that is preferably in the form of an accumulator tank. The exemplary accumulator tank 303 is of a conventional type known in the art which employs an internal bladder. However, the accumulator tank 303 can be of a specific configuration other than that which employs an internal bladder. The accumulator tank 303 is supported by the chassis 300, and is preferably supported by the mounting plate 207.

The water system 300 includes a manifold 310. The exemplary manifold 310 is in the form of an elongated conduit, duct or passageway. The manifold 310 is adapted to convey water in a substantially leak-proof manner. The manifold 310 can have one or more of a variety of specific forms, and can include one or more various types of, or means for, conveying water such as, but not limited to, pipe, tubing, hose and the like. As is seen from an examination of FIGS. 1 through 5, the exemplary manifold 310 is segmented. That is, the manifold 310 is made up of a plurality of portions or segments that are separated by various other components of the system 300 such as the pump 301 and the tank 303, for example. Such segmentation of the manifold 310 is also exemplified by utilization of a variety of specific types of water conveying means and materials, including, but not limited to pipe fittings such as elbows, tees, pipe nipples, couplings, unions, valves, y-strainers and the like, that are joined or assembled, as is illustrated in FIGS. 1 through 5. It is to be further understood that the manifold 310 can be made by utilizing one or more of a number of types of materials, as well as means and/or methods of constructing water conveying means including, but not limited to fabricating, forming, connecting, assembling, bending, threading, welding, gluing, bonding, and the like. Accordingly, inasmuch as such materials, means and methods are generally known to those skilled in the art, no further detail in regard thereto is provided herein.

Figure 6:
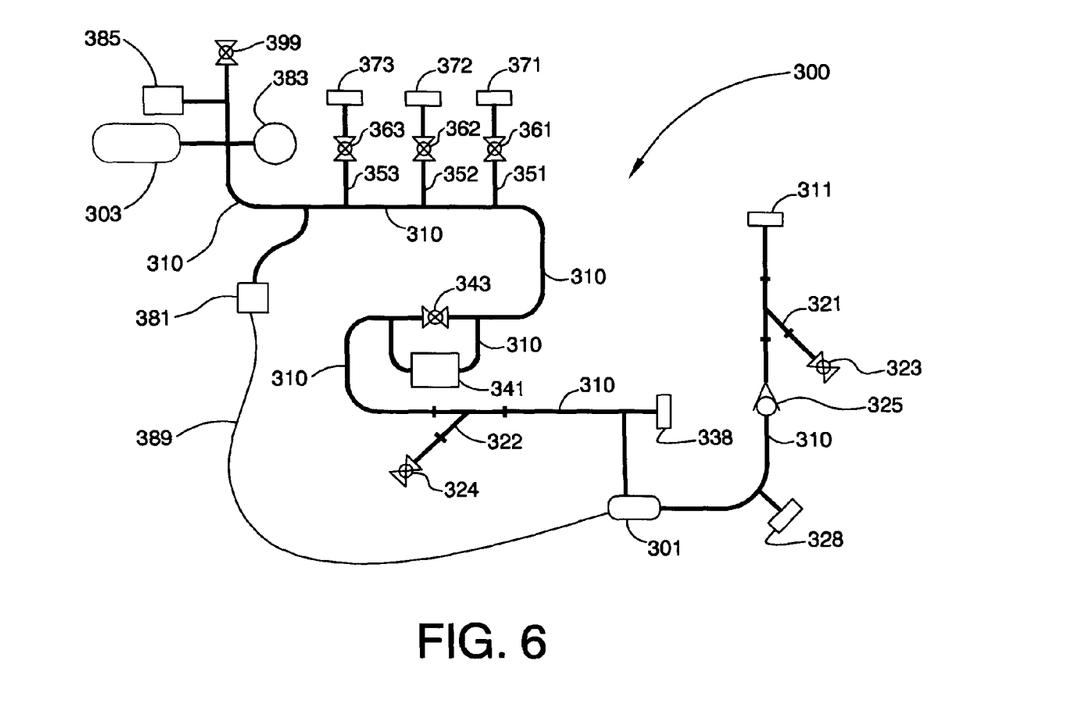
FIG. 6 is a schematic diagram of a portion of the apparatus depicted in FIG. 1.

FIG. 6 is a schematic diagram of the exemplary water system 300. The water system 300 includes the manifold 310. The manifold 310 is elongated and extends between an intake connection 311 and a distal terminus valve 399. During operation and/or use of the exemplary system 300, water enters the system by way of the intake connection 311, and generally flows from the intake connection and toward the terminus valve 399, although such flow may generally exit the system 300 before reaching the terminus valve; as is explained in greater detail below. The intake connection 311 is adapted to be connected or coupled with an external source or supply of potable water, such as an external water storage tank or the like (not shown). The exemplary intake connection 311 is substantially in the form of a male portion of a cam and groove type hose coupling fitting. The exemplary terminus valve 399 is in the form of a manually operable valve such as a ball valve or the like.

The water system 300 includes a first y-strainer 321 that is operatively connected to the manifold 310 between the intake connection 311 and the terminus valve 399. The water system 300 can include a first strainer drain valve 323 that is operably connected to the first y-strainer 321, and which is adapted to facilitate is draining and/or flushing of the first y-strainer. The manifold 310 includes a drain means 328 located between the first y-strainer 321 and the terminus valve 399. The drain means 328 is adapted to be selectively opened and closed in order to facilitate selective draining of water from at least a portion of the system 200. The drain means 328 can include and/or can be in the form of any of a number of specific configurations such as, but not limited to, a plug, a cap, a valve, and the like.

With continued reference to FIG. 6, the pump 301 is operatively connected to the manifold 310 between the drain means 328 and the terminus valve 399. A check valve 325 is operatively connected to the manifold 310 between the first y-strainer 321 and the drain means 328. The check valve 325 is adapted to substantially prevent flow directionally from the pump 301 and toward the intake connection 311. The manifold 310 includes an intermediate connection 338 located between the pump 301 and the terminus valve 399. The intermediate connection 338 is adapted to facilitate selective access to the manifold 310 at a substantially intermediate location thereof. For example, the intermediate connection 338 can be normally closed in order to prevent water flow into and/or out of the manifold 310 by way of the intermediate connection. However, if needed, the intermediate connection 338 can be opened to allow water to flow into and/or out of the manifold 310 by way of the intermediate connection. The intermediate connection 338 can include, and/or be in the form of, any of a number of specific configurations such as, but not limited to a plug, a cap, a valve or the like.

A second y-strainer 322 is operatively connected to the manifold 310 between the intermediate connection 338 and the terminus valve 399. The exemplary water system 300 includes a second strainer drain valve 324 that is operably connected to the second y-strainer 322, and which is adapted to facilitate draining and/or flushing of the second y-strainer. A first outlet leg 351 is operatively connected to the manifold 310 between the second y-strainer 322 and the terminus valve 399. A second outlet leg 352 is operatively connected to the manifold 310 between the first is outlet leg 351 and the terminus valve 399. Similarly, a third outlet leg 353 is operatively connected to the manifold 310 between the second outlet leg 352 and the terminus valve 399. Each of the first, second, and third outlet legs 371, 372, 373 can be constructed and/or formed from the same materials and/or components from which the manifold 310 is constructed and/or formed.

The first, second, and third outlet legs 351, 352, 353 are adapted to serve as the primary water outlets of the water system 300. Accordingly, a first outlet valve 361 is operably connected to the first outlet leg 351, while a second outlet valve 362 is operably connected to the second outlet leg 352, and a third outlet valve 363 is operably connected to the third outlet leg 353. Each of the first, second and third outlet valves 361, 362 and 363 are adapted to facilitate selective control of water output from each of the first, second and third outlet legs 351, 352 and 353, respectively. Each of the exemplary first, second and third outlet valves 361, 362, 363 are in the form of ball valves, although other suitable types of valves can be employed The water system 300 can include a first outlet connection 371 positioned downstream of the first outlet valve 361 and operatively connected thereto. Similarly, a second outlet connection 372 can be positioned downstream of the second outlet valve 362 and operatively connected thereto, while a third outlet connection 373 can be positioned downstream of the third outlet valve 363 and operatively connected thereto, as shown in FIG. 6. Each of the first, second and third outlet connections 371, 372 and 373 is adapted to facilitate selective connection and/or coupling to a respective hose, pipe or the like (not shown) which is intended to receive water output from the water system 300. Accordingly, each of the first, second and third outlet connections 371, 372 and 373 can have any of a number of possible specific forms and/or configurations such as, by way of example only, a portion of a cam and groove coupling fitting, and the like.

The system 300 includes a pressure switch 381 that is operatively connected to the manifold 310 between the third outlet leg 353 and the terminus valve 399. A pressure relief valve 385 is operatively connected to the manifold 310 between the pressure switch 381 and the terminus valve 399. The accumulator tank 303 is operatively connected to the manifold 310 between the pressure switch 381 and the terminus valve 399. A pressure gauge 383 is operatively connected to the manifold 310 between the pressure switch 381 and the terminus valve 399. The pressure gauge 383 is adapted to indicate pressure within the manifold 310.

A cycle stop valve 341 is operatively connected to the manifold 310 between the second y-strainer 322 and the first outlet leg 351: A bypass valve 343 is operatively connected to the manifold 310 in a substantially parallel orientation relative to the cycle stop valve 341, as is depicted in FIG. 5. Such a parallel orientation of the cycle stop valve 341 and the bypass valve 343 enables water flow within the manifold 310 to be selectively routed therein so as to bypass the cycle stop valve by way of selective operational positioning of the bypass valve. More specifically, when the bypass valve 343 is placed in an open position, water flowing within the manifold 310 will pass at least primarily through the bypass valve but not substantially through the cycle stop valve 341. Conversely, when the bypass valve 343 is placed in a closed position, water flowing through the manifold 310 will pass through the cycle stop valve 341 but not through the bypass valve 341.

The exemplary apparatus 100 also includes a pump control means 389. The pump control means 389 is configured to control operation of the pump 301 as a function of pressure within the manifold 310, which pressure is detected by the to pressure switch 381 during operation of the apparatus. By way of an exemplary configuration, the pump control means 389 is adapted to convey a signal from the pressure switch 381 to the pump 301, wherein the pump includes a power relay (not shown), and wherein the power relay is adapted to control operation of the pump as a function of the signal conveyed from the pressure switch. By way of such a configuration, the pressure switch 381 is capable of controlling operation of the pump 301.

With reference now to FIG. 1, the first y-strainer 321 and the cycle stop valve 341 are shown. Additionally, the first outlet valve 361, the second outlet valve 362, and the third outlet valve 363 can be seen. The exemplary first, second and third outlet valves 361, 362, 363 are shown to be in the form of ball valves, although other suitable types of valves can be employed. The intake connection 311 is also shown.

The exemplary intake connection 311 is illustrated to be in the form of a male cam and groove coupling fitting with a protective cap installed thereon.

Turning now to FIG. 2, the first y-strainer 321 is shown. The first strainer valve 323 is also shown, as well as the drain means 328. Additionally, the bypass valve 343 is seen. The exemplary bypass valve 343 is shown to be a ball valve, although other suitable types of valves can be employed. Further study of FIG. 2 reveals the intake connection 311 and the intermediate connection 338. Also seen are the first outlet connection 371, second outlet connection 372 and the third outlet connection 373. The exemplary intake connection 311, intermediate connection 338, first outlet connection 371, second outlet connection 372 and third outlet connection 373 are shown, by way of example only, to be in the form of a respective male cam and groove coupling fitting with an associated protective cap installed thereon.

Referring to FIG. 3, a first side view of a first side of the apparatus 100 is provided. A study of FIG. 3 reveals the drain means 328, the intermediate connection 338, and the cycle stop valve 341. Additionally, the first y-strainer 321, the first strainer valve 323, the first outlet valve 361 and the first outlet connection 371 are shown. Now referring to FIG. 4, a second side view of a second side of the apparatus 100 is provided, wherein the second side is opposite of the first side. The third outlet valve 361 and the third outlet connection 373 are shown. The pressure gauge 383 is also shown. Additionally, the cycle stop valve 341 can be seen, along with the pressure relief valve 385 and the terminus valve 399. With reference to FIG. 5, a top view of the apparatus 100 provided. The inlet connection 311, the first y-strainer 321, the second y-strainer 322, and the bypass valve 343 are shown. Additionally, the first, the second, and the third outlet valves 361, 362, 363 are shown, along with the first, the second, and the third outlet connections 371, 372, and 373.

With reference now to FIGS. 1-6, electrical power can be connected to the apparatus 100 prior to operation of the apparatus. By way of example, an electrical power source (not shown) can be used to provide electrical power to the apparatus 100. By way of further example, an electrical power cord (not shown) can be connected to the power connection means 380 in order to connect or link the apparatus 100 to a suitable electrical power source. Examples of an electrical power source include, but are not limited to, an electrical power grid or an electrical generator.

An external supply of potable water such as a storage tank or the like (not shown) is connected to the apparatus 100 prior to operation. Such an external supply of water can be connected to the exemplary apparatus 100 by way of the intake connection 311. More specifically, for example, a hose (not shown) having a female cam and groove coupling fitting can be connected between the intake connection 311 and a suitable supply of water (not shown). One or more of the first, second and third outlet connections 371, 372, 373 of the exemplary apparatus 100 can be connected to one or more water-receiving facilities (not shown) to which water is to be supplied by the apparatus 100. By way of example, one or more respective hoses (not shown) can be connected between a water-receiving facility and one or more of the first, second and third outlet connections 371, 372, 373 to thereby supply water from the apparatus 100 to the water-receiving facility.

With reference now to FIG. 6, the pump 301 is switched from a power-off status to a power-on or automatic operation status prior to normal use of the exemplary apparatus 100. The bypass valve 343 is normally placed in a closed position, and the cycle stop valve 341 is set or adjusted so as to provide an output water pressure within a desired range. According to one exemplary operational scheme for the apparatus 100, the terminus valve 399 is momentarily opened, as required, in order to bleed off any entrapped air from within the manifold 310. One function of bleeding of such entrapped air is to allow water to enter the system 200 by way of the intake connection 311, whereby entering water displaces the entrapped air as the air is bled or released from the terminus valve 399. The terminus valve 399 is then placed in a closed position after a sufficient quantity of entrapped air is released there through.

Also according to the exemplary operational scheme, and prior to normal operation of the apparatus 100, the first and second strainer valves 323, 324 as well as the first, second and third outlet valves 361, 362 and 363 are placed in respective closed positions. During this time, the accumulator tank 303 builds or accumulates therein a volume of water as well as a level of pressure by way of pumping action of the pump 301. Water pressure within the system 200 rises to a given upper level when the accumulator tank 303 has accumulated therein an associated volume of water and pressure. The pressure switch 381 detects the given upper level of pressure within the system 200. In response to detecting the given upper level of pressure within the system 300, the pressure switch 381, by way of the pump control means 389, causes the pump 301 to cease pumping action.

Upon commencement of an exemplary operational scheme, one or more of the first, second, and third outlet valves 371, 372, 373 is opened as required to supply water to at least one water-receiving facility (not shown). As at least one water-receiving facility begins to use water, the volume of water stored within the accumulator tank 303 decreases, accordingly. Pressure within the manifold 310 also decreases to a given lower level. The pressure switch 381 detects the given lower level of pressure within the manifold 310. In response to detecting the given lower level of pressure, the pressure switch 381, by way of the pump control means 389, causes the pump 301 to begin operating. During exemplary operation of the apparatus 100, the system 300 will settle into a general steady-state operation, wherein the pump 301 operates continuously and the cycle stop valve 341 regulates flow within the system in response to requirements of one or more water-receiving facilities (not shown).

During an exemplary steady-state operation of the apparatus 100, water from an external water supply (not shown) flows through the intake connection 311 and into the manifold 310. From the intake connection 311, water then flows through the first y-strainer 321, then through the check valve 325, then through the pump 301 (where the water is pressurized), then through the second y-strainer 322, then through the cycle stop valve 341, then through one or more of the first, second, and third outlet valves, before flowing out of the apparatus 100 through a respective first, second and third outlet connection 371, 372, 373 and to one or more water-receiving facilities (not shown).

While various specific forms of components of the apparatus 100 are depicted and/or described herein, it is to be understood that other suitable specific forms of such components can be employed within the scope of one or more embodiments of the invention. For example, although specific forms of valves are depicted and/or described herein, it is to be understood that other suitable specific forms of valves can be employed.

The preceding description has been presented only to illustrate and describe methods and apparatus in accordance with respective embodiments of the present invention. It is not intended to be exhaustive or to limit the disclosure to any precise form disclosed. Many modifications and variations are possible in light of the above teaching. It is intended that the scope of the invention be defined by the following claims.

What is claimed is:

1. A water delivery apparatus, comprising:
    a chassis; and
    a water system supported on the chassis, the water system being substantially lead-free and adapted for use with potable water, wherein the system comprises:
        an elongated manifold adapted to convey water in a substantially leak-proof manner;
        an intake connection and a distal terminus valve, wherein the manifold extends between the intake connection and the terminus valve;
        a first Y-strainer operatively connected to the manifold between the intake connection and the terminus valve;
        a drain means operatively connected to the manifold between the first Y-strainer and the terminus valve;
        a pump operatively connected to the manifold between the drain means and the terminus valve, wherein the pump is adapted to selectively induce flow within the manifold directionally from the inlet connection and toward the terminus valve;
        a check valve operatively connected to the manifold between the first Y-strainer and the drain means, wherein the check valve is adapted to substantially prevent flow within the manifold directionally from the pump and toward the inlet connection;
        an intermediate connection operatively connected to the manifold between the pump and the terminus valve;
        a second Y-strainer operatively connected to the manifold between the intermediate connection and the terminus valve;
        a first outlet leg operatively connected to the manifold between the second Y-strainer and the terminus valve;
        a second outlet leg operatively connected to the manifold between the first outlet leg and the terminus valve;
        a third outlet leg operatively connected to the manifold between the second outlet leg and the terminus valve;
        a pressure switch operatively connected to the manifold between the third outlet leg and the terminus valve;
        a pressure relief valve operatively connected to the manifold between the pressure switch and the terminus valve;
        an accumulator tank operatively connected to the manifold between the pressure switch and the pressure relief valve;
        a pressure gauge operatively connected to the manifold between the pressure switch and the pressure relief valve;
        a cycle stop valve operatively connected to the manifold between the second Y-strainer and the first outlet leg; and
        a bypass valve operatively connected to the manifold in substantially parallel orientation relative to the cycle stop valve to thereby enable flow within the manifold to selectively bypass the cycle stop valve by way of selective operation of the bypass valve.

2. The apparatus of claim 1, wherein the chassis comprises:
a pair of frame members, wherein each frame member comprises a substantially continuous loop of elongated structural material, each loop being substantially planar and having a substantially rectangular shape with substantially rounded corners, wherein the frame members are oriented in substantially parallel offset juxtaposition relative to each other; and
a plurality of substantially straight, elongated cross members affixed to and extending between the pair of frame members, wherein each of the cross members is substantially perpendicular to each of the frame members.

3. The apparatus of claim 2, further comprising a substantially planar mounting plate affixed to at least two of the plurality of cross members, wherein the pump and the accumulator tank are supported by the mounting plate.

4. The apparatus of claim 2, wherein at least one of the cross members supports at least a portion of the water system.

5. The apparatus of claim 1, further comprising:
a first outlet valve operatively connected to the first outlet leg;
a second outlet valve operatively connected to the second outlet leg; and
a third outlet valve operatively connected to the third outlet leg.

6. A water delivery apparatus, comprising:
a chassis, comprising a pair of frame members, wherein each frame member comprises a substantially continuous loop of elongated structural material, each loop being substantially planar and having a substantially rectangular shape with substantially rounded corners, wherein the frame members are oriented in substantially parallel offset juxtaposition relative to each other; and a plurality of substantially straight, elongated cross members affixed to and extending between the pair of frame members, wherein each of the cross members is substantially perpendicular to each of the frame members; and
a water system supported by at least one of the cross members of the chassis, the water system being substantially lead-free and adapted for use with potable water, wherein the system comprises:
an elongated manifold adapted to convey water in a substantially leak-proof manner;
an intake connection and a distal terminus valve, wherein the manifold extends between the intake connection and the terminus valve;
a first Y-strainer operatively connected to the manifold between the intake connection and the terminus valve;
a drain means operatively connected to the manifold between the first Y-strainer and the terminus valve;
a pump operatively connected to the manifold between the drain means and the terminus valve, wherein the pump is adapted to selectively induce flow within the manifold directionally from the inlet connection and toward the terminus valve;
a check valve operatively connected to the manifold between the first Y-strainer and the drain means, wherein the check valve is adapted to substantially prevent flow within the manifold directionally from the pump and toward the inlet connection;
an intermediate connection operatively connected to the manifold between the pump and the terminus valve;
a second Y-strainer operatively connected to the manifold between the intermediate connection and the terminus valve;
a first outlet leg operatively connected to the manifold between the second Y-strainer and the terminus valve;
a second outlet leg operatively connected to the manifold between the first outlet leg and the terminus valve;
a third outlet leg operatively connected to the manifold between the second outlet leg and the terminus valve;
a pressure switch operatively connected to the manifold between the third outlet leg and the terminus valve;
a pressure relief valve operatively connected to the manifold between the pressure switch and the terminus valve;
an accumulator tank operatively connected to the manifold between the pressure switch and the pressure relief valve;
a pressure gauge operatively connected to the manifold between the pressure switch and the pressure relief valve;
a cycle stop valve operatively connected to the manifold between the secorid Y-strainer and the first outlet leg; and
a bypass valve operatively connected to the manifold in substantially parallel orientation relative to the cycle stop valve to thereby enable flow within the manifold to selectively bypass the cycle stop valve by way of selective operation of the bypass valve.

7. The apparatus of claim 6, further comprising:
a first outlet valve operatively connected to the first outlet leg;
a second outlet valve operatively connected to the second outlet leg; and
a third outlet valve operatively connected to the third outlet leg.

8. The apparatus of claim 7, further comprising:
a first outlet connection operatively connected to the first outlet valve;
a second outlet connection operatively connected to the second outlet valve; and
a third outlet connection operatively connected to the third outlet valve.

9. A water delivery apparatus, comprising:
a chassis, comprising a pair of frame members, wherein each frame member comprises a substantially continuous loop of elongated structural material, each loop being substantially planar and having a substantially rectangular shape with substantially rounded corners, wherein the frame members are oriented in substantially parallel offset juxtaposition relative to each other; a plurality of substantially straight, elongated cross members affixed to and extending between the pair of frame members, wherein each of the cross members is substantially perpendicular to each of the frame members; and a substantially planar mounting plate affixed to at least two of the plurality of cross members; and
a water system supported by at least one of the cross members of the chassis, the water system being substantially lead-free and adapted for use with potable water, wherein the system comprises:
an elongated manifold adapted to convey water in a substantially leak-proof manner;

an intake connection and a distal terminus valve, wherein the manifold extends between the intake connection and the terminus valve;

a first Y-strainer operatively connected to the manifold between the intake connection and the terminus valve;

a drain means operatively connected to the manifold between the first Y-strainer and the terminus valve;

a pump operatively connected to the manifold between the drain means and the terminus valve, wherein the pump is adapted to selectively induce flow within the manifold directionally from the inlet connection and toward the terminus valve;

a check valve operatively connected to the manifold between the first Y-strainer and the drain means, wherein the check valve is adapted to substantially prevent flow within the manifold directionally from the pump and toward the inlet connection;

an intermediate connection operatively connected to the manifold between the pump and the terminus valve;

a second Y-strainer operatively connected to the manifold between the intermediate connection and the terminus valve;

a first outlet leg operatively connected to the manifold between the second Y-strainer and the terminus valve;

a first outlet valve operatively connected to the first outlet leg;

a first outlet connection operatively connected to the first outlet valve;

a second outlet leg operatively connected to the manifold between the first outlet leg and the terminus valve;

a second outlet valve operatively connected to the second outlet leg;

a second outlet connection operatively connected to the second outlet valve;

is a third outlet leg operatively connected to the manifold between the second outlet leg and the terminus valve;

a third outlet valve operatively connected to the third outlet leg;

a third outlet connection operatively connected to the third outlet valve;

a pressure switch operatively connected to the manifold between the third outlet leg and the terminus valve;

a pressure relief valve operatively connected to the manifold between the pressure switch and the terminus valve;

an accumulator tank operatively connected to the manifold between the pressure switch and the pressure relief valve;

a pressure gauge operatively connected to the manifold between the pressure switch and the pressure relief valve;

a cycle stop valve operatively connected to the manifold between the second Y-strainer and the first outlet leg; and a bypass valve operatively connected to the manifold in substantially parallel orientation relative to the cycle stop valve to thereby enable flow within the manifold to selectively bypass the cycle stop valve by way of selective operation of the bypass valve.

* * * * *